March 10, 1931.  S. M. REDFIELD  1,795,377
POULTRY FEEDING UNIT
Filed March 16, 1928
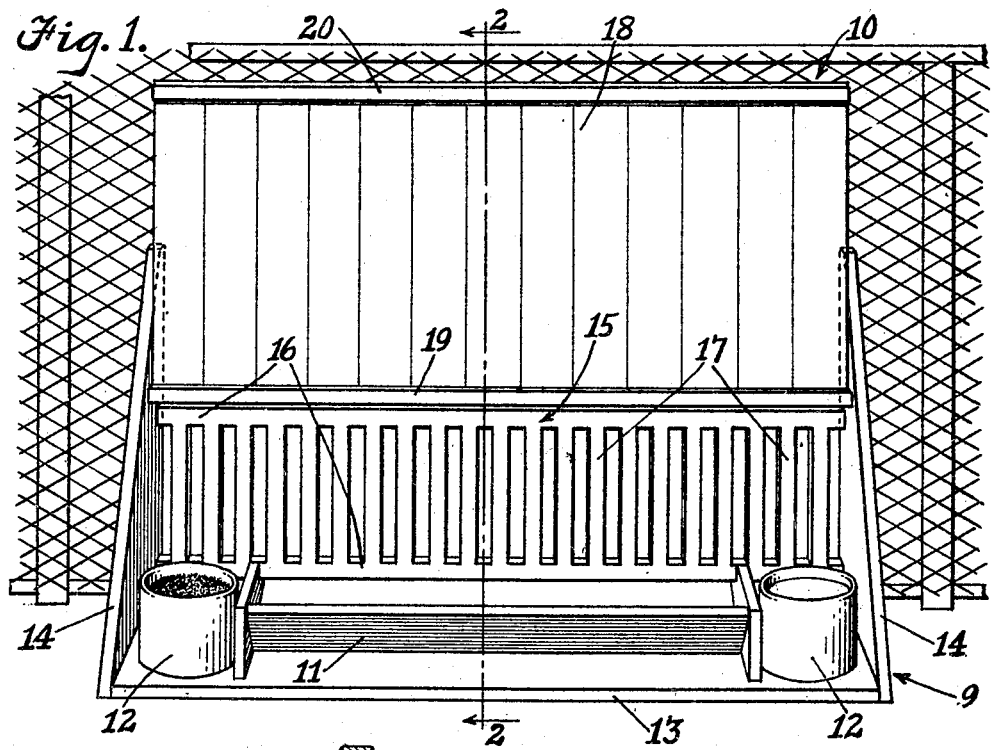
Fig. 1.
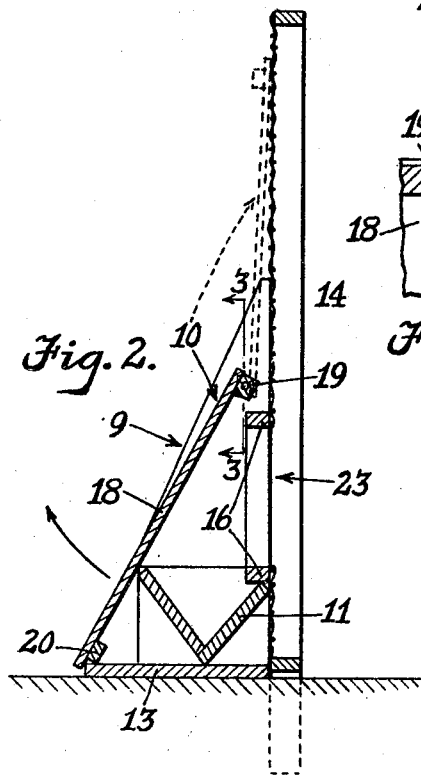
Fig. 2.
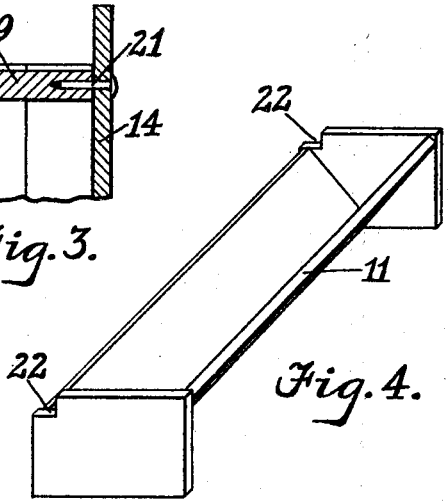
Fig. 3.
Fig. 4.
INVENTOR,
Stephen M. Redfield
BY
ATTORNEY.

Patented Mar. 10, 1931

1,795,377

UNITED STATES PATENT OFFICE

STEPHEN M. REDFIELD, OF LOS ANGELES, CALIFORNIA

POULTRY-FEEDING UNIT

Application filed March 16, 1928. Serial No. 262,194.

My invention relates to feeding and watering devices for domestic animals, especially for poultry, and is an improvement on the device shown in my application for a patent on a poultry feeding device, filed July 21st, 1926, under Serial No. 123,826.

The primary object of my invention is to provide a portable unit adapted to be placed just outside a fence or poultry house, said unit being adapted to hold a supply of feed and water so as always to be accessible to the poultry confined in a pen of which the fence is a part or in the poultry house.

A further object is to provide a covered feeding and watering unit in which the feed and water is kept clean and wholesome and is protected from the weather and against birds or stray animals, so that there is practically no waste or loss of feed.

A further object is to provide a poultry feeding and watering device, of the character described, having detachable feed and water containers which readily may be removed for cleaning and refilling, without entering the pen or poultry house.

Other objects and advantages will appear hereinafter and while I show herewith and will describe a preferred form of construction, I desire it to be understood that I do not confine my invention to such preferred form but that various changes and adaptations may be made therein without departing from the spirit of my invention as hereinafter claimed.

Referring to the drawings which accompany this specification and form a part thereof, Fig. 1, is a front perspective view of my poultry feeding unit, with its cover raised so as to give access to the feed and water containers, for the purpose of cleaning or refilling them.

Fig. 2, is a transverse sectional view of the feeding unit shown in Fig. 1, with the cover lowered, the section being taken on line 2—2 of that figure.

Fig. 3, is an enlarged sectional detail view of one end of the door or cover, showing one of the pivot pins, upon which it turns.

Fig. 4, is a view, in perspective of the feed trough forming part of my poultry feeding unit, by itself.

Considering the drawings more in detail, my poultry feeding unit will be seen to consist of a portable housing 9, having a pivoted door or cover 10, adapted to enclose a feed trough 11, and two water containers 12, one of which may be used for holding ground oyster shells or the like material instead of water, if such use is preferred. The housing is constructed of a floor-board or platform 13, two triangular uprights 14, the lower and wider ends of which are securely fastened to the ends of platform 13, and a rack 15 formed of two rails 16 fixed between uprights 14, in spaced and parallel relation to each other and to platform 13, and a series of equally spaced vertical bars 17 fixed between parallel rails 16. Cover 10 is made of matched lumber 18, or other water-tight material, nailed to a pivot-rail 19, extending between uprights 14 somewhat above upper rail 16, and to a tie-rail 20, parallel to pivot-rail 19 and in suitably spaced relation thereto. Cover 10 is pivotally attached to uprights 14 by pins 21 which extend through the latter into the ends of pivot rail 19 of the former and is thus adapted to swing downwardly so as to enclose the feed trough and water containers.

The feed trough 11 is made somewhat shorter than the housing, so that, when placed in the middle thereof, sufficient space is left at each end to permit the insertion of water containers 12 between it and uprights 14, as shown in Fig. 1. One side of the trough is made low enough to permit its being shoved under the lower rail 16 of rack 15, and notches 22 are cut in the end-pieces on that side of the trough, to provide sufficient clearance so that the trough as a whole may be shoved thereunder to such an extent as to be held by lower rail 16 from being shifted out of place when the cover is raised, while permitting its withdrawal therefrom, with but slight effort. A further advantage of this construction is that said rail 16, as well shown in Fig. 2, projects beyond the inclined side of the trough over which it is located, in such a manner as to prevent the fowls from dragging the mash or other feed out of the trough, as they are apt to do to a greater or less extent when feeding at troughs having inclined sides. The water containers may be made of metal or other suitable material and are preferably cylindrical in form, as shown.

Uprights 14 are so shaped that one side of the housing, the open side, is vertical and the other, the covered side, is inclined. The vertical side readily may be fastened to the outer side of a fence forming a pen, as shown in Figs. 1 and 2, or of a wall, forming part of a poultry house, the only requirement being that an opening 23, coinciding in extent with the size of rack 15, be made in the fence or the wall so that the fowls may get their heads and necks between bars 17 of the rack far enough to reach the feed and water in the trough and containers, respectively. It is evident that feed and water which is kept in my feeding unit is so protected from dirt and filth that there is a minimum of wastage as well as a minimum of labor in keeping it properly supplied.

Perhaps the greatest advantage that can be claimed for my feeding and watering unit is that its use permits the replenishing of feed and water without interference from the fowls, inasmuch as it can be done entirely from the outside of the pen or poultry house. Its portability is also convenient and useful, more especially for families and poultrymen who keep a comparatively small number of fowls.

Having thus illustrated and described my invention, I claim:

1. A feeding unit comprising a rack, upright walls extending outwardly from said rack at the ends thereof respectively, means for mounting a feed trough outwardly of and immediately below said rack, and a cover pivoted to said upright walls to swing outwardly and downwardly over a feed trough on said mounting means.

2. A portable feeding unit comprising a platform, a pair of upright end walls upstanding from said platform, a rack secured to said upright end walls above said platform, and a cover pivoted to said upright end walls to be swung outwardly and downwardly over said platform.

STEPHEN M. REDFIELD.